No. 725,874. PATENTED APR. 21, 1903.
C. RILEY.
PLUMBER'S CLAMP FOR WIPING JOINTS.
APPLICATION FILED FEB. 2, 1903.
NO MODEL.
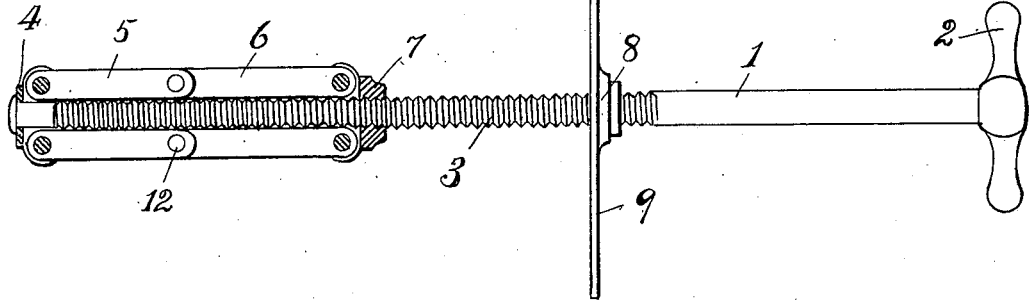
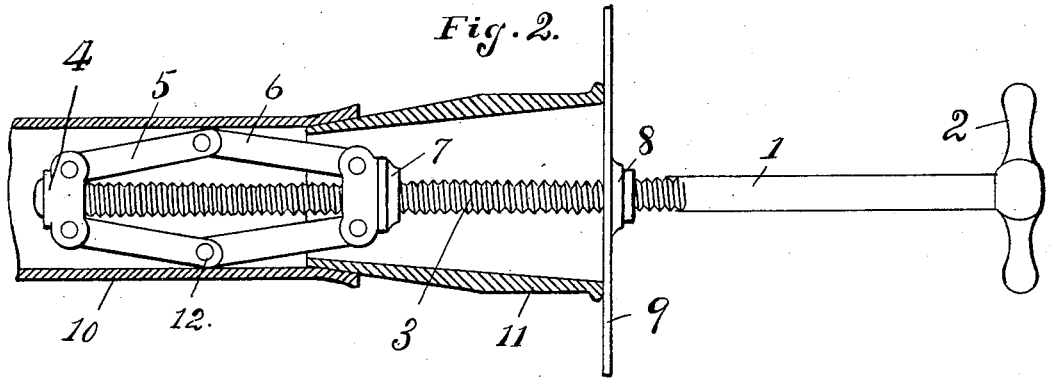
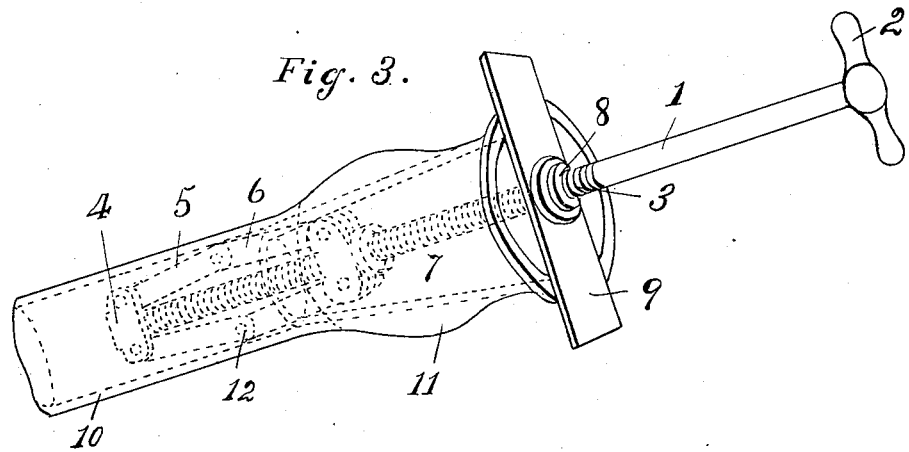
WITNESSES:
K. Lockwood-Nevins
Bessie Gorfinkel
INVENTOR.
Chas. Riley
BY
Francis M. Wright,
ATTORNEY

UNITED STATES PATENT OFFICE.

CHARLES RILEY, OF SAN FRANCISCO, CALIFORNIA.

PLUMBER'S CLAMP FOR WIPING JOINTS.

SPECIFICATION forming part of Letters Patent No. 725,874, dated April 21, 1903.

Application filed February 2, 1903. Serial No. 141,431. (No model.)

*To all whom it may concern:*

Be it known that I, CHARLES RILEY, a citizen of the United States, residing at San Francisco, in the county of San Francisco and State of California, have invented certain new and useful Improvements in Plumbers' Clamps for Wiping Joints, of which the following is a specification.

My invention relates to plumbers' clamps for wiping joints, the object of my invention being to provide a device of this character which will securely hold together in position for wiping a joint the brass ferrule and the end of the lead pipe.

Great inconvenience has been experienced heretofore by plumbers, when securing a brass ferrule to the end of a lead pipe, in holding the two together in position while wiping the joint. This has been accomplished in several ways; but none of them are satisfactory on account of the instability of the parts and the liability of the joint to crack before it is finished.

It is the object of my invention to provide a clamp which can be conveniently and readily inserted and which will hold the parts together firmly and securely during the operation and at any angle desired.

In the accompanying drawings, Figure 1 is a side view of the clamp. Fig. 2 is a sectional view of the end of a lead pipe and a brass ferrule held in position, the clamp being shown in side elevation. Fig. 3 is a perspective view of the joint after being wiped, the device being still in position.

Referring to the drawings, 1 represents a rod having a handle 2 at one end and screw-threaded for the greater portion of its length, as shown at 3. On the other end of said rod is a revoluble collar 4, to which are hinged the toggle-arms 5 6, the other ends of which arms are attached to a nut 7, which travels along the screw. Upon said screw is also a threaded collar 8, having integral therewith a plate 9 of sufficient length to extend over the edge of the brass ferrule.

In operation the lead pipe (shown at 10) and the brass ferrule (shown at 11) are placed in position, and the toggle-arms are inserted in the lead pipe. Then upon turning the rod the toggle-arms and the parts connected thereto do not turn with the rod on account of contact of such parts with the inner side of the lead pipe, and the nut travels toward the revoluble collar, thereby expanding the toggle-arms and pressing the joints 12 of said toggle-arms firmly against the inner wall of the lead pipe and securely clamping said device in said pipe. The collar 8, with the plate secured thereto, is now revolved upon the screw until said plate abuts against the end of the brass ferrule. Then by turning said plate the brass ferrule may be securely clamped within the end of the lead pipe. The edge of the pipe may now be swaged down upon the brass ferrule, so as to render the same as smooth as possible before applying the solder, and then the joint may be wiped.

I claim—

The plumber's clamp comprising the screw, the toggle-levers having a nut upon said screw and arranged to expand by the movement of the nut relatively to the screw, and the threaded collar upon the screw having a plate arranged to engage the edge of the ferrule and hold the same in position, substantially as described.

In witness whereof I have hereunto set my hand in the presence of two subscribing witnesses.

CHARLES RILEY.

Witnesses:
FRANCIS M. WRIGHT,
BESSIE GORFINKEL.